United States Patent [19]

Segerstrom

[11] E Re. 31,078

[45] Reissued Nov. 9, 1982

[54] VIDEO TAPE RECORDER SYSTEM HAVING MEANS FOR SUPPRESSING VIDEO TRACK CROSSOVER NOISE DURING SLOW AND FAST MOTION OPERATION

[75] Inventor: Richard J. Segerstrom, Portola Valley, Calif.

[73] Assignee: Video Logic Corporation, Sunnyvale, Calif.

[21] Appl. No.: 29,688

[22] Filed: Apr. 13, 1979

Related U.S. Patent Documents

Reissue of:

[64] Patent No.: 3,662,101
Issued: May 9, 1972
Appl. No.: 882,971
Filed: Dec. 8, 1969

[51] Int. Cl.[3] ..... H04N 5/78; H04N 7/12

[52] U.S. Cl. ..... 360/10.3; 360/11.1; 360/37.1; 360/38.1

[58] Field of Search ..... 360/10, 11, 64, 33, 360/36–38; 358/168

[56] References Cited

U.S. PATENT DOCUMENTS

| | | | |
|---|---|---|---|
| 3,157,739 | 11/1964 | Okamura | 360/38 |
| 3,170,031 | 2/1965 | Okamura | 360/10 |
| 3,197,559 | 7/1965 | Kihara | 360/37 |
| 3,202,769 | 8/1965 | Coleman | 360/36 |
| 3,290,438 | 12/1966 | Okamura | 360/64 |
| 3,356,921 | 12/1967 | Bradford | 318/314 |
| 3,469,029 | 9/1969 | Bell | 360/33 |
| 3,573,357 | 4/1968 | Lace | 360/11 |

FOREIGN PATENT DOCUMENTS

| | | | |
|---|---|---|---|
| 42-2182 | 1/1967 | Japan | 360/10 |

*Primary Examiner*—Bernard Konick
*Assistant Examiner*—Alan Faber
*Attorney, Agent, or Firm*—Limbach, Limbach & Sutton

[57] ABSTRACT

A helical scan video tape recorder suitable for slow and fast motion modes of operation is disclosed. A plurality of video fields are recorded in each video track extending across the video tape such that the burst of noise produced when the magnetic head crosses over the guard band between separate video tracks during the slow or fast mode of operation of the video recorder is encountered in only one of the field regions in the video track. This burst of noise is utilized to control the television monitor circuit so that the video field region which is free of noise is reproduced on the monitor while the video field region which contains the noise is blanked out from the monitor. As the noise progresses from one field region to the succeeding field region in the video track, means is provided for automatically switching to display of the noise-free field region. Means is provided for at times controlling the brightness of the monitor to compensate for those instances at switchover where two fields are reproduced in succession without the intervening blank period. A ramp generator circuit is provided for compensating for the change in timing of the vertical sync pulses during the slow and fast motion periods. In another embodiment, an additional magnetic head is utilized for reproducing the noise-free video field during the time period that the monitor would ordinarily be blanked out to thereby provide a 100 percent duty cycle in the video monitor.

28 Claims, 12 Drawing Figures

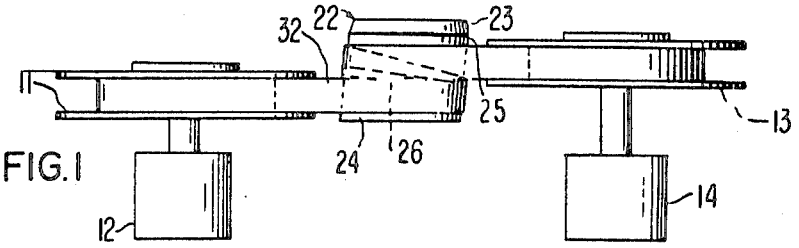
FIG.1
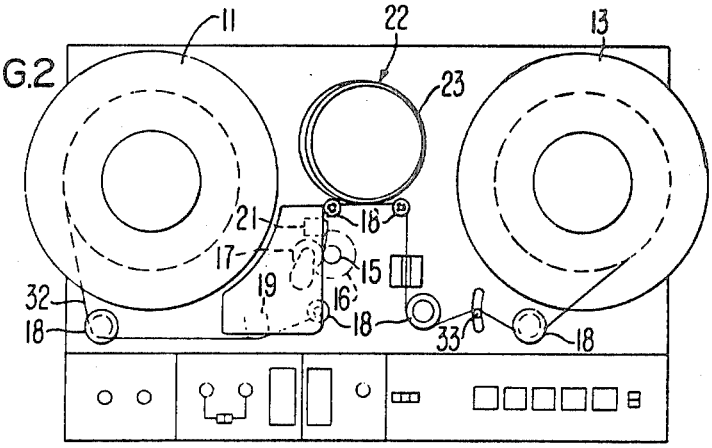
FIG.2
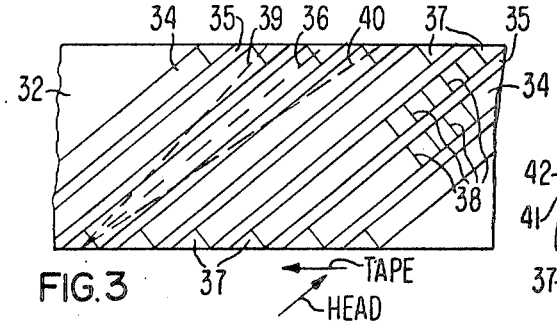
FIG.3
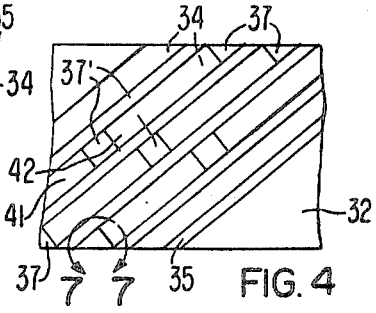
FIG. 4
FIG.5
| | |
|---|---|
| FIG.5A | FIG. 5B |
| FIG.5C | FIG.5D |
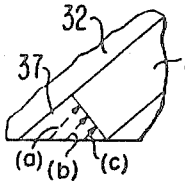
FIG. 7

VIDEO TAPE RECORDER SYSTEM HAVING MEANS FOR SUPPRESSING VIDEO TRACK CROSSOVER NOISE DURING SLOW AND FAST MOTION OPERATION

Matter enclosed in heavy brackets [ ] appears in the original patent but forms no part of this reissue specification; matter printed in italics indicates the additions made by reissue.

BACKGROUND OF THE INVENTION

In the well known helical scan video tape recorders, the magnetic video tape has a plurality of video tracks recorded in an angularly disposed direction across the tape, the individual video tracks being separated by a guard band. Each individual video track records a complete field or frame of a television picture, the vertical sync signal of the field being recorded at the top and bottom ends of each video track. A plurality of horizontal sync signals are also recorded in each individual track, for example, 262½ horizontal sync signals or lines per individual video track.

In the playback mode of operation, the magnetic tape passes in a helical wrap around the rotating magnetic head of the recorder, the head tracing a path centered through one of the video tracks and reproducing the television field recorded therein. As the recorder head passes off the one video track at the upper edge of the lower wrap of the tape, it passes onto the next video track at the bottom edge of the upper wrap of the video tape and reproduces the field recorded therein. Thus, the recording head traces each individual video track from bottom to top in succession. The speed of travel of the video tape and the speed of the rotating recording head are so adjusted that the recording head is made to be centered in the video track while automatically operated speed control circuits are utilized to maintain the proper tracking between video track and recording head.

When the relative speed between the magnetic head and the video tape is changed from the normal motion speed, for example where slow forward or reverse or fast motion reproduction speeds are adopted, the magnetic head no longer traces the center tracking of the video track but angles off on a different path, the actual direction being determined by the extent of the speed change as well as the direction of the change. Where the speed is decreased in the forward direction, the magnetic head will follow a path bridging over the guard band and onto the forward adjacent video track. With an increased speed, the path of the magnetic head crosses the guard band and moves onto the next rearward video track.

For each revolution of the magnetic head, one portion of the field in one track is reproduced, followed by a portion of the field from the adjacent track after the crossover. Because of the very close relationship in time between the picture recorded on one track and the picture on the adjacent track, it is difficult for the eye to detect a change in the monitor picture between the portion reproduced from one track and the following portion reproduced from the adjacent track. However, the magnetic head, in passing from one track to the other track and over the guard band therebetween, will produce a short burst of noise which appears at the junction of the two picture portions as a narrow horizontal band or series of streaks across the television picture.

Due to the fact that the magnetic head passes between the successive video tracks at a guard band crossover point which moves progressively between the bottom and top edges of the tape, for slow motion forward speeds the noise band travels from the upper edge of the picture tube down to the lower edge of the picture tube and then starts over again at the top. This noise band appearing in the picture during slow motion and continuously moving down the screen is very disturbing to the eye as the picture is being viewed. For fast motion speed and slow motion reverse, the disturbing noise band appears at the bottom of the picture and moves up.

BRIEF DESCRIPTION OF THE INVENTION

It is the object of the present invention to provide a video recorder system in which the speed of motion of the picture on the monitor may be changed from normal motion, for example, a change to slow motion or fast motion, and wherein the picture disturbance produced by the passage of the magnetic head between adjacent video tracks and over the guard band between the tracks may be eliminated from the video picture on the monitor.

In the present invention two separate fields are recorded on each individual video track from the video camera, the fields being recorded at a rate of 120 per second rather than the standard of 60 per second. The vertical sync pulse between the two separate fields in each track is recorded at the midpoint of the track. Thus, for each revolution of the magnetic head, two separate fields are reproduced. When the speed of the video tape is changed for fast or slow motion, the video head will cross over the guard band between two adjacent tracks only once per revolution and this crossover point will occur in the region between the fields recorded in the upper half of the tape, depending upon the particular location of the crossover point at that particular instance in time. Although the crossover point between successive video tracks will change its location along the guard band from top to bottom, it will occur at only one particular place for each revolution of the head. Therefore, the noise burst produced by the head crossover between video tracks will occur in one field or the other for any particular one video track but not in both fields on the same revolution of the head. By selecting for reproduction on the monitor only that half of the video track which is free from the noise burst produced by crossover, the noise will not be reproduced on the television screen.

Since a picture will be reproduced on the monitor only during one-half of a revolution of the head and the picture will be blanked from the screen during the other half of the period, there will be some reduction in the brightness of the picture. However, because of the nature of the human eye and the persistence of the picture tube, this reduction in duty cycle is hardly discernible by the viewer. On the other hand, the elimination of the noise burst travelling across the picture greatly improves the viewability of the picture to the viewer.

Selection of the noise-free field to be shown on the monitor is made automatically under control of the crossover noise bursts. Noise pulses occurring in one field region on the tape will cause selection of the other field region for display. As the position of the noise pulses moves from the one field region to the other field region, the display on the monitor switches from the display of said one field region to display of the other field region under control of the noise pulses.

At the point of switchover from reproduction of one field region to reproduction of the other field region, the last field ON time in one series will be followed immediately by an ON time for the first field in the next series so that no blank on OFF time will occur between these two reproduced fields. To the viewer of the monitor, the two successive ON field regions will appear as a momentary brightening of the picture and will result in a flickering sensation to the viewer. To eliminate this flickering, means is provided for lowering the brightness of the picture on the monitor during the time period that these two successive field regions are being reproduced on the monitor at the switchover.

In another embodiment of the invention, a second magnetic head and video amplifier is utilized, the head being spaced 180° from the first video head, the second head and associated circuitry operating to reproduce the noise-free field on the video monitor during the period of time that the first reproducer head is encountering the video field region with the noise located therein, i.e. during what would normally be the blank field period on the video monitor. A 100 percent duty cycle for the television monitor is therefore obtained.

These and other features of the present invention will become apparent from a perusal of the following specification taken in connection with the accompanying drawings.

BRIEF DESCRIPTION OF THE DRAWINGS

FIG. 1 is a plan view of the tape transport arrangement of a typical helical scan video tape recorder which may be utilized in practicing the present invention.

FIG. 2 is a top view of the tape transport apparatus of FIG. 1.

FIG. 3 is a schematic representation of the prior art video tape showing the arrangement of the slanted video traces and the paths the record-reproduce head follows at various tape speeds.

FIG. 4 is a schematic representation of video tape utilized in the present invention and showing the new arrangement of the video tracks.

FIG. 7 is an enlarged view of one portion of a video track on the magnetic tape taken at section line 7—7 of FIG. 4.

DESCRIPTION OF THE PREFERRED EMBODIMENTS OF THE INVENTION

Figure 5A:
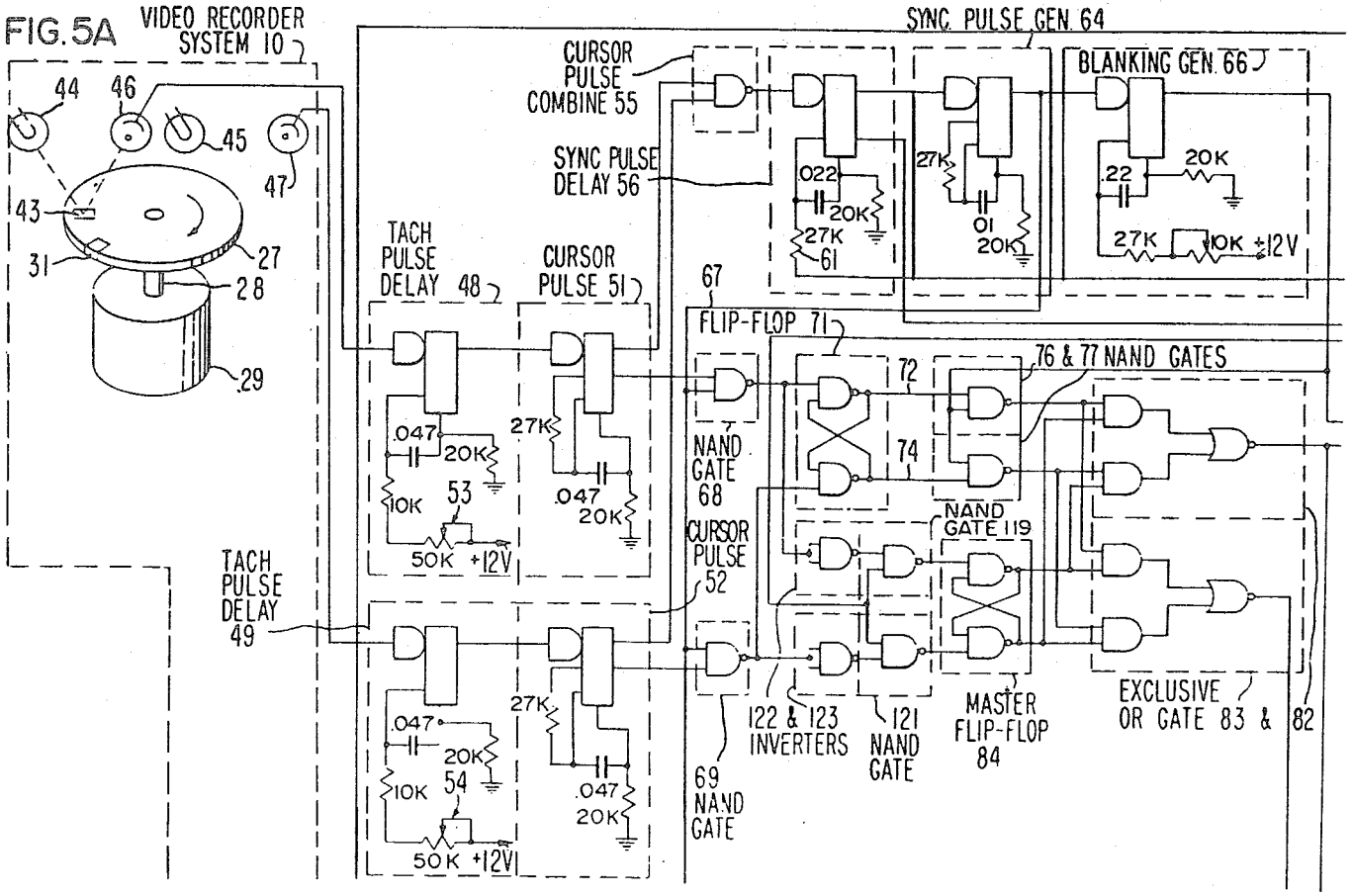
FIG. 5 illustrates the arrangement of the sheets of drawings of FIGS. 5A through 5D which show a schematic diagram of one embodiment of a video recorder control circuitry employing the present invention.
Figure 5B:
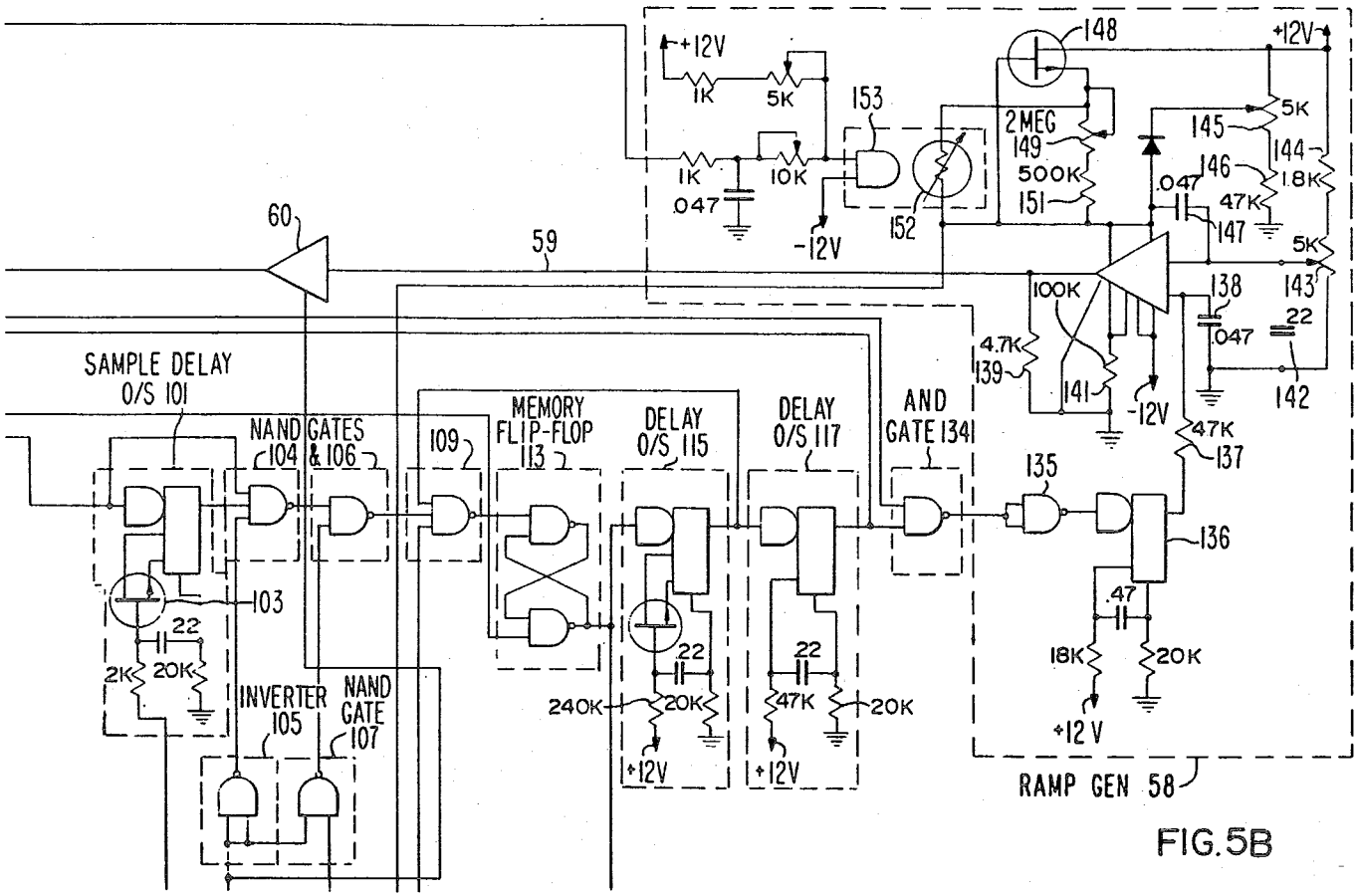
Figure 5C:
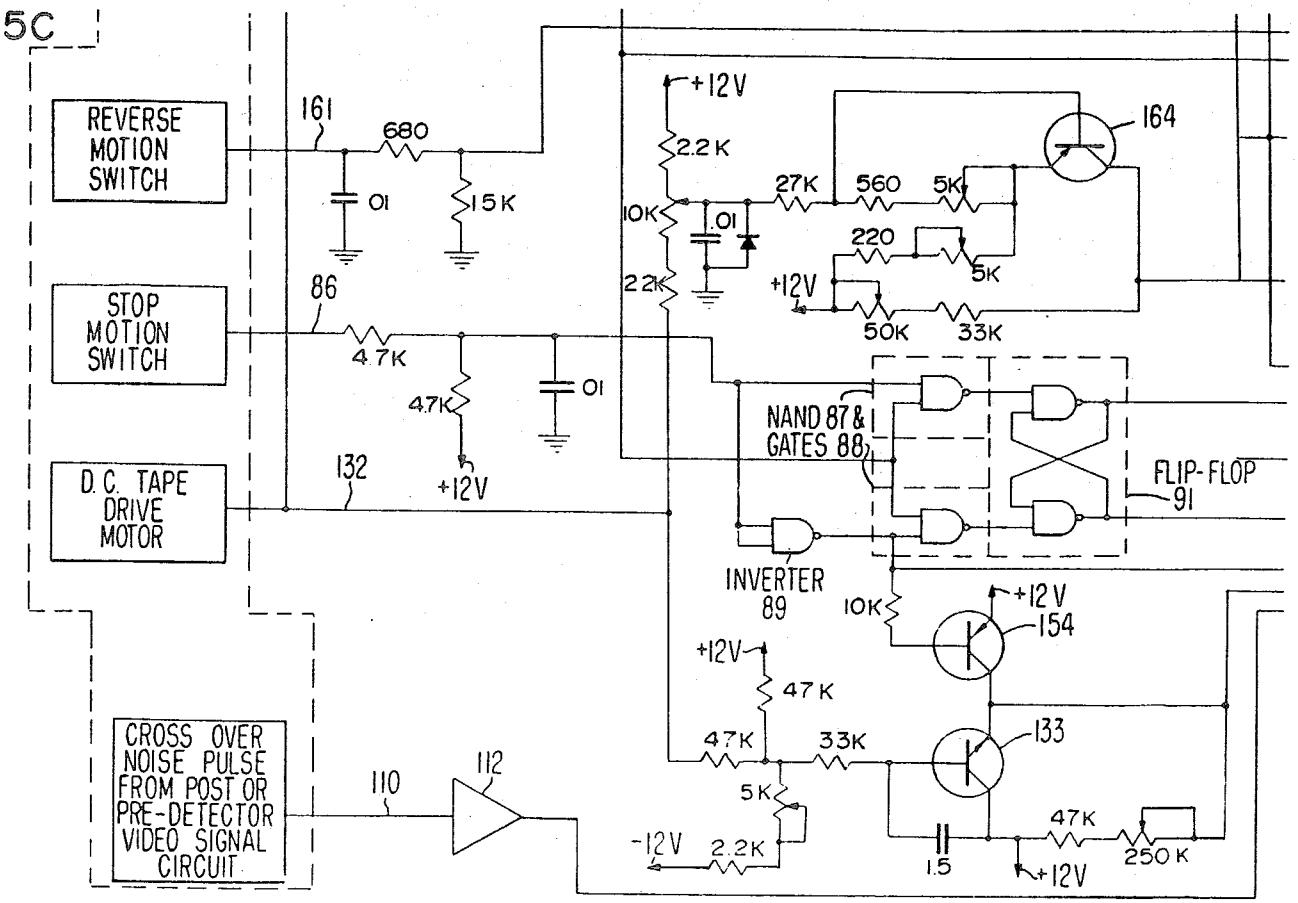
Figure 5D:
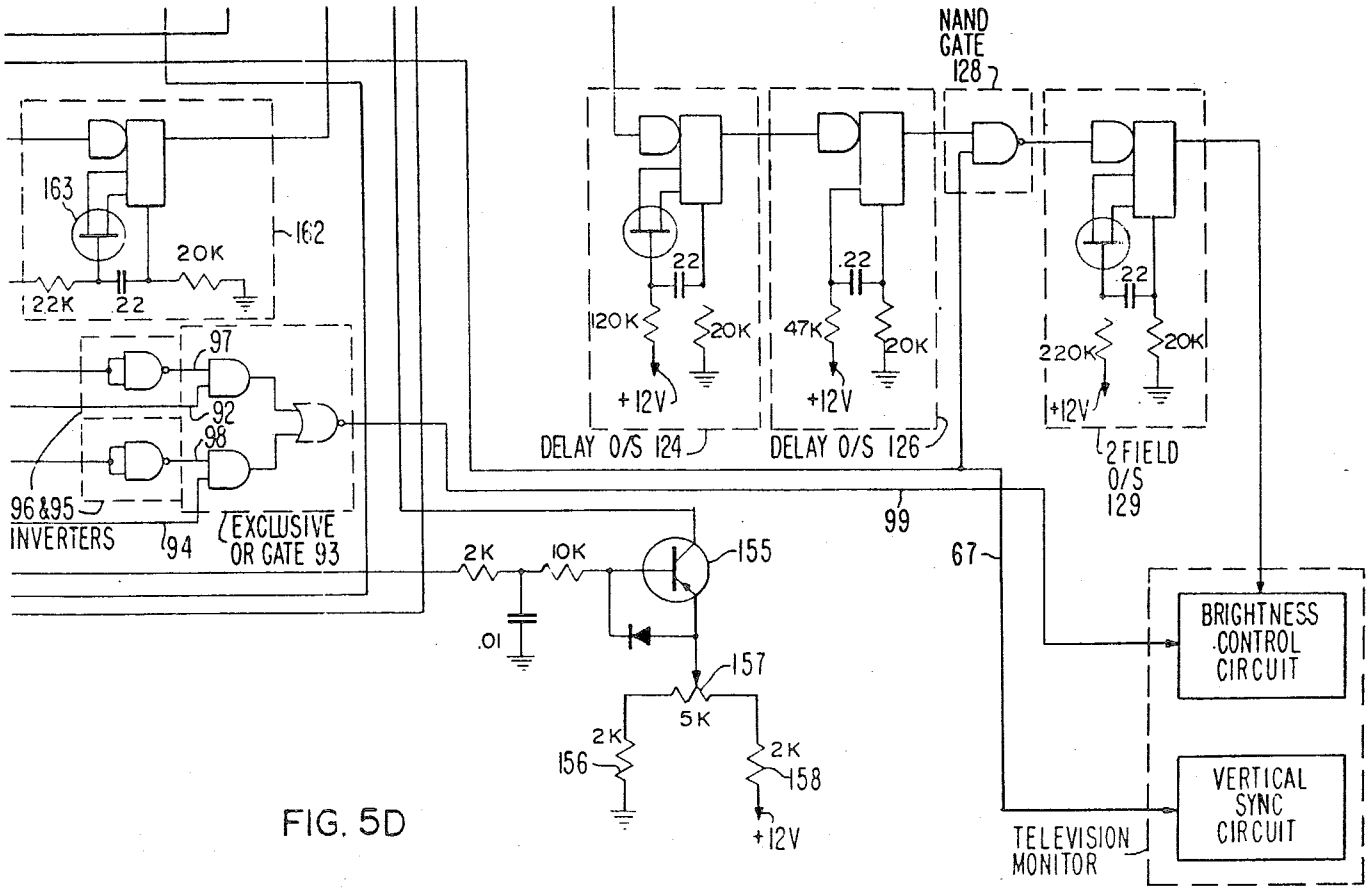

Referring now to FIGS. 1, 2, 3 and 5A, the helical scan video tape transport of a typical video recorder 10 to which the present invention relates comprises a tape supply reel 11 and supply reel motor 12, take-up reel 13 and take-up reel motor 14, tape drive capstan 15 and capstan drive motor 16, capstan pinch roller 17, tape guide posts 18, erase head 19, audio and control track head 21 and the helical scan drum assembly 22. The scan assembly 22 consists of a tape drum 23 mounted at a slight angle with respect to the vertical, the drum having a lower segment 24 separated from an upper segment 25 by an annular gap 26 sloped slighty relative to the horizontal. A head disk 27 is rotatably mounted within the drum on the drive shaft 28 driven by head drive motor 29, a magnetic record-reproduce video head 31 being secured at one point on the periphery of the disk 27 (See FIG. 5A).

The magnetic tape 32 is threaded past the erase, and audio and control track heads 19 and 21, respectively, and is wound in one complete loop in a helical manner about the tape drum 23. The upper and lower edges of the tape 32 are placed in abutting relationship at their crossover point at the beginning and ending point of the tape loop. The tape is threaded past a tape tensioning arm 33 and wound on the take-up reel 13. The tape 32 is driven by means of capstan 15 and capstan pinch roller 17 from the left-hand reel 11 to the right-hand reel 13 during record and playback and the head disk 27 and magnetic video head 31 rotate in a clockwise direction, the tape 32 and head 31 thus travelling in opposition directions. The tape 32 passes over the gap 26 in the drum 23 while the head rotates rapidly around in the gap 26 and traces a plurality of successive, spaced-apart video tracks 34 on the tape 32 which are sloped at some selected angle determined by the physical characteristics of the tape drive, a typical slope being 4°45′. The video tracks 34 are about 6 mil wide and are spaced apart by guard bands 35 about 3 mil wide. During the record mode of operation the recorder system lays down the sloped video tracks 34, an audio track near and parallel to one edge of the tape 32, and a control track consisting of a plurality of spaced-apart control pulses near and parallel to the other edge of the tape. During playback, the speeds of the tape 32 and the head 31 are synchronized by means of the control track signals so that, for the normal speed mode of operation, the video head 31 is centered on the recorded video tracks 34 in succession and follows the path indicated by the dotted line 36.

In a typical 60 field video recorder, the video head 31 rotates at a speed of 3,600 revolutions per minute with the tape moving at a longitudinal speed of approximately 7 inches per second. Each rotation of the video head records (or plays back) one video field, including the vertical sync and blanking pulses 37 which are recorded at the top and bottom edge of the tape where the head crossover occurs, and the plurality of horizontal sync pulses 38.

Helical scan video recorders are well known in the art and are fully described in published material and no further detailed description of the tape transport apparatus, the video and audio record and reproduce circuitry, or the television monitor circuitry will be given here except as the operation of specific portions relate to and are desirable for an understanding of the present invention. The present embodiment was developed using a Model IVC-800 color Video Recorder manufactured and sold by the International Video Corporation of Mountain View, Calif. and a standard model of television monitor.

When the speed of the tape is changed on playback, for instance for slow motion forward or reverse, or fast motion, the head deviates from the central path 36. For example, if the tape is brought to a full stop, the head will trace a path such as that designated by the dotted line 39. For speeds between a full stop and normal speed, the head will trace a path lying somewhere between the dotted lines 36 and 39. When the speed is doubled from normal speed, path 40 is followed, the path falling between dotted lines 36 and 40 for fast speeds between normal and twice normal speed. When the direction of the tape is reversed for reverse slow motion, the path angles off slightly more than path 39.

As the path of the head deviates from the normal, centered path, it crosses over the guard band 35 between tracks 34 and produces the undesired noise band in the video picture viewed on the television monitor. During forward slow motion and for successive passes of the head across the tape, the crossover point on the successive guard bands 35 progresses from the bottom of the tape to the top.

In the present invention, the fields are recorded on the magnetic tape 32 as shown in FIG. 4 wherein two fields 41 and 42 with a separating vertical sync pulse 37' are recorded in each track across the tape. The video camera thus produces 120 fields per second rather than the standard 60. It should be mentioned that FIGS. 3 and 4 are not drawn to scale, e.g. the vertical sync pulses are grossly enlarged relative to the track length.

The horizontal sync pulses 38 are recorded so that they fall into alignment across the video tracks. This is to insure that the video head, when crossing or bridging from one video track to another, will encounter the horizontal sync pulses on the two adjacent video tracks at the same point in time, to thereby provide horizontal stability to the picture.

It can be seen that, if the lower fields 41 are termed the even fields and the upper fields 42 are termed the odd fields, the crossover points between tracks will fall either in the odd fields or the even fields but not in both at any one time, except where the crossover occurs in the middle or at the edges of the tape.

Referring now to FIG. 5, there is shown one preferred embodiment of the control circuitry utilized in the present invention. In order to understand the operations of this schematic diagram, it will be assumed that the video recorder 10 is operating in the playback mode in slow forward motion and that the noise produced by the head crossing over the guard band between video tracks is occurring during reproduction of the even pictures or fields so that the even pictures are being blanked out and the odd pictures are being displayed on the monitor.

Figure 6:
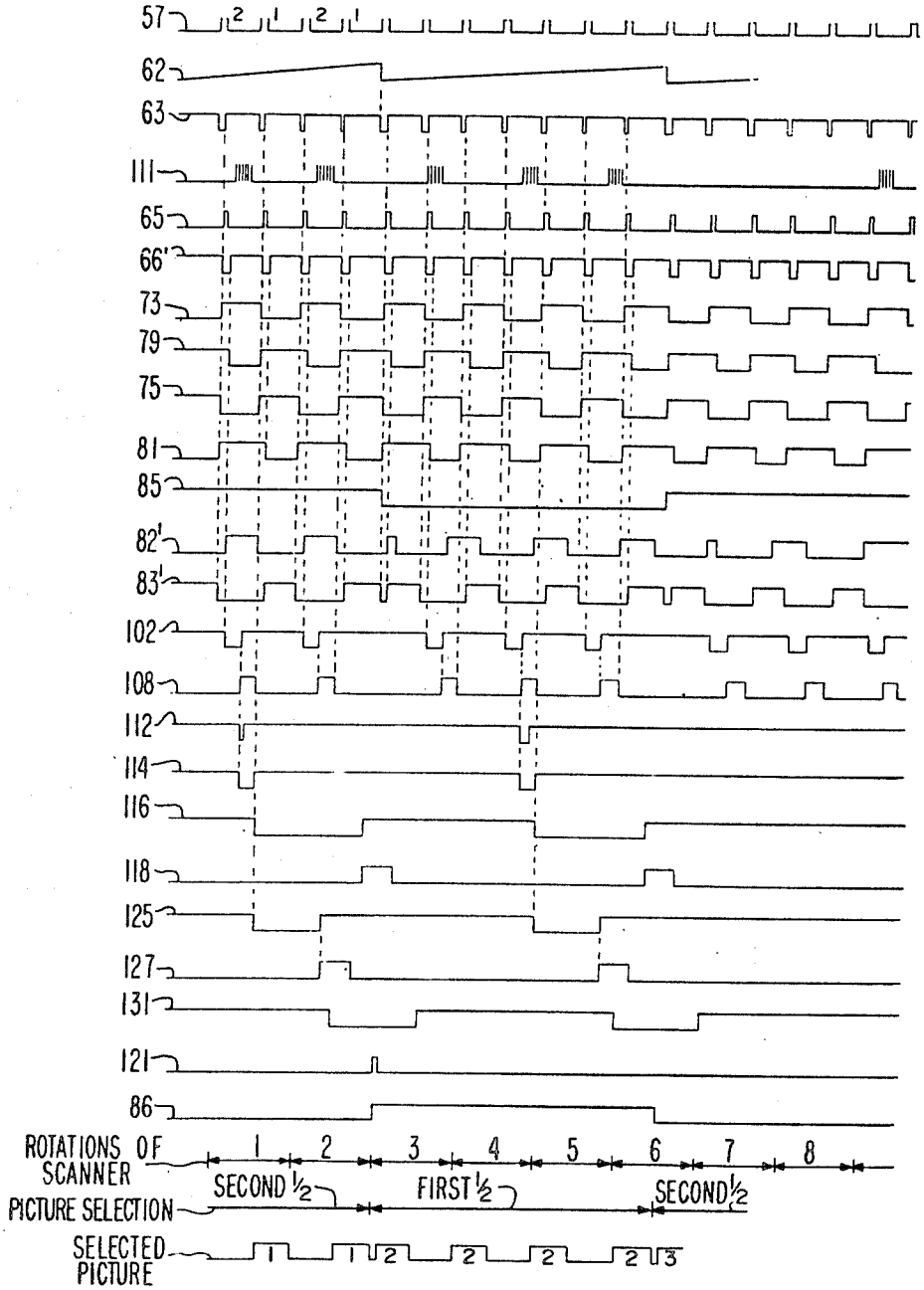
FIG. 6 shows a plurality of electrical traces illustrating the operation of certain of the components shown in FIG. 5.

The circuit of FIG. 5 is in the condition shown in the left-hand end of the traces of FIG. 6. The lower output of the master flip-flop circuit 84 (trace 86) is low and the upper output is high (trace 85), the output of the flicker control pulse one-shot circuit 129 (trace 131) to the television monitor is high, and the output of the memory flip-flop 113 (trace 114) is high. The pulses of noise due to the head crossover are occurring at periodic intervals on the lead 110 from the video recorder 10 (trace 111), the number of noise pulses per unit of time being determined by the tape speed.

It should be noted that no noise pulses appear during certain revolutions of the magnetic head since, during one or more revolutions, the head will move across a video track but does not leave the track to cross over to the adjacent track. The exact number of noise pulses and their spacing is a function of the tape drum, recorder head and tape geometry, the track layout on the tape including video track and guard band width, and the speed of the tape adopted during playback.

A tachometer apparatus for producing 120 pulses per second comprises a light reflector strip 43 secured to the head disk 27 of the video tape recorder 10 which also carries the magnetic head 31 in the periphery thereof. The reflector strip 43 passes under the two light beams produced by the two light sources 44 and 45 which are spaced 180° apart on the path of rotation of the head disk. Two light detectors 46 and 47 are positioned to intercept the light reflected by strip 43 from the two light sources 44 and 45, respectively, each detector detecting a pulse of light once for each revolution of the head.

The tachometer pulses from the light detector 46, the even field pulses, are transmitted to a first one-shot circuit 48, while the pulses of light from the second light detector 47, the odd field pulses, are transmitted to a second one-shot circuit 49. The trailing edge of the output pulses from the two tach pulse delay one-shot circuits 48 and 49 serve to trigger pulse outputs from the two associated cursor pulse one-shot circuits 51 and 52, respectively. One shots 48 and 49 are provided with variable resistors 53 and 54 for controlling the time duration of their output pulses and thus the start time of the output pulses of one-shots 51 and 52. The 1.5 millisec. output pulses of one-shots 51 and 52 may, therefore, be adjusted in time so as to be exactly 180° apart, to compensate for any slight deviation from this spaced relationship by the tachometer pulses.

During the normal speed mode of operation of the video recorder, the vertical sync signals recorded on the video tape are utilized by the recorder as the vertical sync signals for the television monitor. However, if desired, the tachometer pulses could be utilized to develop the vertical sync pulses even during the normal motion of operation and the vertical sync pulses could be eliminated from the magnetic tape. When the speed of the video recorder is changed from the normal speed in playback, the vertical sync signals reproduced from the video tape appear mutilated and are not usable since they will result in a vertical jitter in the picture on the monitor. Therefore, new vertical sync signals are created from the output pulses of the one-shots 51 and 52 for utilization by the monitor in lieu of the vertical sync signals from the tape. The negative going output pulses are transmitted to a NAND gate 55 which serves as a cursor pulse combiner, the output pulse serving to trigger a sync pulse delay one-shot circuit 56. The output pulses from the NAND gate 55 are shown in trace 57 in FIG. 6, the output pulses corresponding to the output pulses from circuit 51 being labeled (2), or even, and those from circuit 52 being labeled (1), or odd. The time duration of the one-shot 56 is controlled by the analog voltage output of a ramp generator 58 coupled over lead 59 on through the operational amplifier 60 to the resistor 61 in the one-shot 56. An increasing voltage output from the ramp generator 58 and amplifier 60 (trace 62) will produce a decreasing time duration for the output pulse of one-shot 56 (trace 63). The trailing edge of the output pulse of one-shot 56 triggers a sync pulse generator one-shot circuit 64 to produce the vertical sync pulses (trace 65) transmitted to the video recorder monitor circuit over lead 67 for use in lieu of the sync pulses on the video tape.

The variable width sync delay pulses (trace 63) compensate for the fact that, as the magnetic head deviates from the center of the video tracks, it encounters the beginning of a field at a slightly different time in the head cycle than the beginning of the field was encountered in the preceding cycle. This can be more easily understood by referring to FIG. 7 which shows the beginning end of a recorded video track 34 including the vertical sync region 37. Three successive paths for the magnetic head in slot motion are shown as dotted lines (a), (b) and (c). It can be seen that the time for the head to traverse path (a) from the bottom edge of the tape to the end of the vertical sync region is longer than the time for the progressively shorter paths (b) and (c). This change in timing for successive cycles, if not corrected, results in a vertical jitter of the displayed picture on the monitor. By utilizing the linear ramp to produce progressive changes in the width of the successive sync delay pulses (trace 63), this timing problem is corrected and the vertical jitter eliminated.

The detailed operation of the ramp generator 58 will be given below.

The sync pulses are also transmitted to a blanking generator one-shot circuit 66 which produces an output pulse (trace 66') for each sync pulse, the leading edge of the blanking pulse being in synchronism with the leading edge of the sync pulse.

The sync pulses are also transmitted over lead 67 to one of the inputs to each of two NAND gates 68 and 69, which also have input leads coupled to the positive going pulse outputs of the one-shot circuits 51 and 52, respectively. The time duration of the alternate pulses from one shots 51 and 52 are made long enough to span the time of the corrected sync pulses received from the sync generator 64. The output pulses from the NAND gate 68 are coupled to one input of a square wave output flip-flop circuit 71 while the output pulses from the NAND gate 69, which alternate in time with the pulses from NAND gate 68, are coupled to the other input to the flip-flop 71. The square wave output from flip-flop 71 on lead 72 is shown in trace 73 and the inverted square wave output on lead 74 is shown in trace 75. It can be seen that the leading edges of each square wave are in synchronism with the corrected sync pulses, trace 65.

The output lead 72 from flip-flop 71 is connected to one of the input leads to NAND gate 76 while the other output lead 74 is coupled to one of the input leads to NAND gate 77. The other two input leads to the two NAND gates 76 and 77 are coupled to the output of the blanking pulse generator 66. The negative going blanking pulses (trace 66') delay the outputs of NAND gates 76 and 77 from going negative when their respective inputs from the flip-flop 71 go positive until the negative going blanking pulse terminates. This results in square wave outputs from NAND gate 76 (trace 79) and NAND gate 77 (trace 81) which have a longer positive going half cycle than negative going half cycle by twice the length of the blanking pulse.

The output of NAND gate 76 is coupled to one of the inputs of each of two exclusive OR gates 82 and 83 while the output of NAND gate 77 is coupled to a different one of the inputs to the OR gates 82 and 83.

During this period of operation when the lower output of master flip-flop 84 is low (trace 86) and the upper output is high (trace 85), the output of the exclusive OR gate 83 (trace 83') will go low when the output on NAND gate 77 (trace 81) goes high. The output of gate 83 will remain low until the output of NAND gate 77 (trace 81) goes low.

Stop motion can be enabled in the recorder circuit by a switch which stops the recorder tape drive; operation of this circuit when the stop action switch is operated is described below. Until the stop action switch is operated, negative voltage is standing on lead 86. One input to NAND gate 87 is thus low, and one input to NAND gate 88 from the inverter 89 is high. The positive going sync pulses from the sync generator 64 on the other two inputs to the two NAND gates 87 and 89 result in the flip-flop 91 being maintained in one state with its upper output lead high and its lower output lead low. Thus the input lead 92 to exclusive OR gate 93 is maintained high and the input lead 94 maintained low. At the time the output of OR gate 83 goes low (trace 83'), a high exists on the output of gate 82. The inverters 95 and 96 invert these two outputs so that the input lead 97 to OR gate 93 is high and the input lead 98 goes high to cause the output of the OR gate 93 to go low. Thus, as gate 83 goes low, the output lead 99 of OR gate 93 to the television monitor goes low to turn the picture off at the monitor. This lead 99 remains low until the output of gate 83 again goes high, at which time this lead 99 to the monitor goes high to turn the monitor picture ON.

The gate 83 is low during the reproduction time of the even pictures, those on the lower half of the magnetic tape, including the blanking pulse periods at the beginning and end of the even pictures, and thus the even pictures are blanked out on the monitor screen. The output of gate 83 is high during the reproduction time of the odd pictures, the upper half of the video tape, and thus the odd pictures are displayed on the monitor. Since the crossover noise pulses are being produced during the time of the even pictures and these even pictures are being blanked out, the undesirable noise streaks are not seen on the monitor.

When the two upper input leads to the exclusive OR gate 82 assume a common state relative to the other common state of the two lower input leads, the output of OR gate 82 will assume the one or high state. This occurs, for example, when the output of the NAND gate 76 goes low (trace 79) while the output on the lower lead of master flip-flop 84 is low (trace 86) and the outputs of NAND gate 77 and the upper lead of master flip-flop 84 are high (traces 81 and 85, respectively).

The high state on the output of gate 82 initiates operation of the sample delay one-shot circuit 101 which produces a negative going pulse output (trace 102). This sample pulse is of variable time duration determined by the voltage on the gate of the FET 103 for reasons described below. At the end of the time delay of the one-shot circuit 101, the output goes high to the associated input to NAND gate 104. A second input to gate 104 is high from the output of gate 82. The third input from inverter 105 is normally high, and, therefore, the output of NAND gate 104 to one of the inputs of NAND gate 106 goes low. One input to NAND gate 107 is normally low so that the output of gate 107 to the other one of the inputs to NAND gate 106 is normally high. Therefore, the output of NAND gate 106 goes high (trace 108) at one of the inputs to the NAND gate 109.

NAND gates 105 and 107 come into play in the reverse mode of operation of this circuit which will be described in detail below.

Since the video recorder is operating at a slow motion speed, noise pulses (trace 111) due to the head crossing over the guard band are being generated in the recorder circuitry, and these noise pulses are transmitted over lead 110 and through amplifier circuit 112 and appear as positive going pulses at one of the input leads to NAND gate 109. Those noise pulses occurring during the early portion of a field track on the tape will appear at gate 109 early in the time cycle and before the sample pulse (trace 108) appears on the other input lead and these early noise pulses will result in no output from the gate 109.

If there is no coincidence between the noise pulse (trace 111) and the sample gate pulse (trace 108), the NAND gate 109 will remain unchanged and the output of gate 106 will go low when the output of gate 82 goes low due to the output of NAND gate 76 (trace 79) going positive.

As the noise pulses begin to make their appearance closer to the end of the field which is being blanked out, one of these noise pulses, for example, the one which is second from the last noise pulse at the end of the field, coincides with the input pulse (trace 108) on gate 109 and a negative going pulse (trace 112) appears on the input to the memory flip-flop 113. The output of flip-flop 113 goes low (trace 114) until the receipt of the next negative going blanking pulse (trace 66') from the blanking generator 66. The flip-flop 113 operates on the leading edge of the blanking pulse and triggers the delay one-shot 115 which operates to produce a 22-millisecond pulse (trace 116). The positive going trailing edge of this delay pulse triggers a 6-millisec. delay one-shot 117 which operates to produce a 6-millisec. output pulse (trace 118).

The zero state output of the one shot 115 is coupled to the input of NAND gate 109 to disable this gate so that subsequent noise pulses will not be allowed to operate the flip-flop 113 during the 22-millisec. delay time.

It can be seen from traces 116 and 118 that the time duration of one-shot 115 is slightly less than one and one-half revolutions of the recorder head and that the time duration of one-shot 117 spans over the period of the third and fourth half revolutions after initial operation of one-shot 115.

The positive going output of one-shot 117 appears on the inputs to two NAND gates 119 and 121, the other inputs of NAND gates 119 and 121 being connected to the outputs of NAND gates 68 and 69 through inverters 122 and 123, respectively. On initiation of the next sync pulse from sync generator 64 to gates 68 and 69 during the ON time of the pulse from one-shot circuit 51, the output of NAND gate 119 goes positive (trace 121) and triggers the master flip-flop 84 to cause its upper output lead (traces 85) to go to the zero state and its lower output lead (trace 86) to go to the one state.

Thereafter, the output of exclusive OR gate 83 (trace 83') will go high when the output on NAND gate 76 (trace 79) goes low and low when gate 76 goes high. Gate 83 will go low during the reproduction time of the odd pictures, those on the upper half of the magnetic tape, including the blanking pulse periods at the beginning and end of the odd pictures. Therefore, the negative going output pulses on the output of gate 83 will cause the odd pictures to be blanked from the monitor and the even pictures to be reproduced. Since the noise pulses will now be occurring during the reproduction time of the odd pictures, the crossover noise will be blanked out. Only the noise-free even pictures will be reproduced until such time as the noise pulse (trace 111) again coincides with the sample time pulse (trace 108) to produce the triggering pulse (trace 112) for the memory flip-flop circuit 113, and, ultimately, the switching of master flip-flop 84.

Before the switching of the master flip-flop 84, the odd pictures are appearing on the monitor alternating with blank periods during the even picture period. Because of the speed at which this picture on-off cycle is taking place, the human eye does not detect the blank periods on the monitor. However, at the switchover from reproduction of the odd pictures on the monitor to reproduction of the even pictures or fields, the last odd picture shown is followed immediately by the first even picture without the ordinary blank period between pictures. This can be seen on trace 83' which shows two adjacent positive pulses at the time period when the master flip-flop switches (traces 85 and 86). These two successive ON times will appear to the human eye as a sudden, momentary brightening of the picture on the monitor. The succession of periodic picture brightenings will take the form of a flicker, which is disturbing to the viewer. In order to eliminate this flicker, the present circuit is provided with a means to dim the last picture and the first picture at each changeover point to thus keep the brightness of the picture reproduction over these two particular fields at a constant level to the human eye.

When the output of memory flip-flop 113 goes high (trace 114), it triggers operation of a delay one-shot circuit 124 to produce a 14-millisec. negative going output pulse (trace 125). At the termination of this pulse, delay one-shot 126 is triggered to produce a 6-millisec. positive going pulse (trace 127) on one input to the NAND gate 128.

The timing of one-shots 124 and 126 is selected so that the ON time of one-shot 126 (trace 127) bridges the start time of the last odd picture to be displayed before switching to display of the first even picture, and when the vertical sync pulse (trace 65) from sync pulse generator 64 is received on the other input of NAND gate 128 at the start of the last odd picture, the NAND gate produces an OFF state pulse at its output. This negative going pulse triggers operation of the two-field one-shot circuit 129 to produce an output pulse (trace 131) to the brightness control circuitry in the monitor control to dim the picture. The operation time of one-shot circuit 129 is set to span two pictures or fields; the end of the pulse (trace 131) extends into the time period of the blank picture following the first even picture and its termination time is therefore not critical.

As the speed of the video tape relative to the speed of the recorder head changes from the normal speed, the number of noise pulses per unit length of time changes. For example, as the tape decreases in speed, and the picture motion becomes slower, the number of noise pulses that occur over the length of the cyclic reproduction of one field region (i.e. odd or even field region) increase in number. The present system is arranged to sample the last three noise pulses in the one-half of the video track being blanked before switching over to blank the fields from the other half of the video track. Because of the variable spacing between these last three pulses with varying slow motion speeds, the time duration of the sample gate one-shot 101 is made variable with tape speed.

When the recorder is switched from normal speed to the "slow motion mode", the recorder tape drive is switched from an A.C. driving motor to a D.C. motor, the speed of the tape being controlled by the D.C. voltage applied to the D.C. drive motor, the lower the voltage, the slower the speed. Assume that, in switching from normal speed to slow motion, the speed is switched to 25 percent of normal and a certain level of D.C. voltage appears on lead 132. This voltage controls the voltage level applied to the base of emitter follower transistor 133 to control the voltage applied to the FET 103 and thus control the time length of the sample delay pulse (trace 102). At a slow motion of 25 percent of normal motion, the delay pulse (trace 102) is made just long enough to give a sample gate pulse (trace 108) wide enough to bridge the last three noise pulses at the end of a field region. As the motion becomes slower and the rate at which the noise pulses occur increases, the D.C. voltage on lead 132 becomes lower and produces an increase in the length of the sample delay pulses (trace 102). The time of the sample gate (trace 108) is thus shortened so as to bridge only the more rapidly occurring last three noise pulses.

At the time the output of delay one-shot 117 to one input of NAND gate 134 is high, the next positive going pulse from the synce pulse delay one-shot 56, synchronous with the negative going pulse shown in trace 63, appearing at the other input to NAND gate 134 causes the output of gate 134 to go high. The output of inverter 135 then goes low and triggers the one-shot circuit 136. The positive pulse output of one-shot 136 pulls the ramp generator 58 down and starts the ramp generator on a new charge-up cycle.

The ramp generator includes a pulse input wave shaping circuit formed by resistor 137 and condenser 138. Resistors 139 and 141 form a part of the output amplifier circuit and capacitor 142 serves as a by-pass condensers. Resistors 143 and 144 control the base or starting voltage level for the ramp while resistors 145 and 146 control the peak voltage level, the difference between these two voltage levels controlling the width of the sync delay pulse output of one-shot 56. Capacitor 147 is the main charging capacitor of the ramp.

FET 148, resistors 149 and 151, and the resistance of photoconductor 152, form a controllable constant current source, the current determining the slope of the ramp output.

As the motion decreases from normal motion to slower motion, the field scan rate, i.e. the number of different fields scanned per unit time, decreases, the noise pulse rate increases, and the time period between field or picture switchover times increases. Since the ramp output must rise from the base voltage level to the peak voltage level during the period between successive switchover times, the slope of the ramp must decrease as the switchover times increase, i.e. as the motion becomes slower.

As mentioned above, the D.C. voltage on lead 132 decreases as the picture motion becomes slower, the this D.C. voltage is used to control a lamp 153 associated with the photoconductor 152. The lower the D.C. voltage, the darker the lamp and the higher the resistance of the photoconductor 152. An increase in the photoconductor resistance produces a decrease in the current flow through the FED circuit to the capacitor 147, and thus a decrease in the ramp slope. Conversely, an increasing D.C. voltage with increasing picture motion gives an increasing current flow to capacitor 147 and an increased ramp slope. The low voltage appearing on the output of inverter 89 during the stop motion mode of operation of the recorder, described more fully below, operates transistor 155 to clamp the output of the ramp generator to a selected voltage level between the base and peak levels determined by the setting of the resistance network including resistors 156, 157 and 158.

When the recorder is switched to the "reverse" mode of operation and run at slow motion, the direction of movement of the tape is reversed and the crossover noise points occur at the top of the tape and progress down, the noise band appearing at the bottom of the picture on the monitor and moving up the picture. It is therefore necessary to position the sample gate pulse (trace 108) at the beginning end of a field rather than the finishing end. When the recorder is placed in the reverse mode, positive voltage is connected to lead 161. The output of inverter 105 goes low and serves to decouple the sample delay one shot 101 from the NAND gate 109. The output of NAND gate 104 goes high. The output of the exclusive OR gate 82 now serves to trigger the one-shot 162, when gate 82 goes high at the beginning of a field, the output of one-shot 162 goes high to NAND gate 107. The two highs on the input to gate 107 produce a low on its output to NAND gate 106 which causes the output of gate 106 to go high to NAND gate 109. A sample pulse similar to trace 108 is therefore created at the beginning of each field and awaits coincidence with a noise pulse (trace 111) to trigger the memory flip-flop 113 as described above.

The length of this sample pulse output of NAND gate 106 is controlled by the timing circuit of the one-shot 162 including the FET circuit 163 and the inverting network including transistor 164 and associated circuitry. As mentioned above, the tape speed is decreased by decreasing the D.C. voltage applied to the D.C. tape drive motor in the recorder. This decreasing voltage appears on lead 132 to the voltage inverting network of transistor 164, and an increasing output is transmitted to the timing circuit of one-shot 162. An increasing voltage produces a shorter pulse time for one-shot 162 and thus a shorter sample time to bridge only the last three noise pulses occurring at the beginning end of the fields.

In reverse, the high on lead 161 is also used to invert the ramp output signal from the operational amplifier 60 to reverse the time delays of the successive sync delay pulses (trace 63).

When the stop motion switch of the recorder is operated, negative voltage is removed from lead 86 and the output of inverter 89 goes low, transistor 154 is turned on and the voltage on the lead to the timing circuit including FET 103 of sample delay one-shot 101 goes high. The operate time of one shot 101 becomes very short (trace 102) and the sample time of NAND gate 109 (trace 108) becomes the total time of a complete field. The sample gate is thus opened wide so that the next incoming noise pulse, wherever it occurs in either of the two field regions, will cause the memory flip-flop 113 to operate and start the switchover cycle. Since the switchover occurs at the end of the third field region, i.e. one and one-half head revolutions after receipt of the noise pulse, the field region selected for viewing will be the one in which the crossover noise is occurring. This system is designed to automatically switch to the opposite, noise-free field region.

When the negative potential is removed from lead 86 and the input lead to NAND gate 87 goes high and the input lead to NAND gate 88 goes low, the flip-flop circuit 91 operates to make its upper output lead 92 low and its lower output lead 94 high. The exclusive OR circuit 93 operates to reverse its output on lead 99 to blank out the picture that the monitor would normally be showing in stop motion and display the opposite picture.

The lower three traces in FIG. 6 illustrate (a) the periods of rotation of the magnetic head, (b) the halves of the tape being selected for display on the monitor, and (c) the frames or pictures selected and numbered consecutively.

It will be noted that in this system as described the pictures taken by the video camera and recorded on the video tape are at the rate of 120 per second. Thus pictures are reproduced at the rate of 60 per second, and this two-to-one speed ratio enhances the slow motion characteristics of the displayed picture. To further enhance these slow motion characteristics, the number of fields recorded in each track can be increased, e.g. the camera can take 180 or 240 pictures per second and record three or four fields per track. With the crossover noise appearing in one of the field regions, the first or second adjacent field region is selected for reproduction, and the picture on the monitor blanked out during the other two or three field region periods, including the one containing the noise. Since the pictures taken at 180 or 240 per second are being displayed at the rate of 60 per second, the slow motion aspects of the displayed picture are substantially enhanced. The fact that the picture is on for only one-third or one-quarter of the time does not noticeably detract from the picture quality, and these duty cycles are clearly acceptable. Thus, the number of fields recorded per unit time can be increased as desired within acceptable low percentage duty cycles.

The present invention, although described with reference to its use with a 360° wrap helical scan recorder, is equally applicable for use with the omega wrap helical scan recorders using two, 180° spaced record heads. The invention may also be used with the spiral recorded disc video recorders as well as spiral drum recorders.

Figure 8:
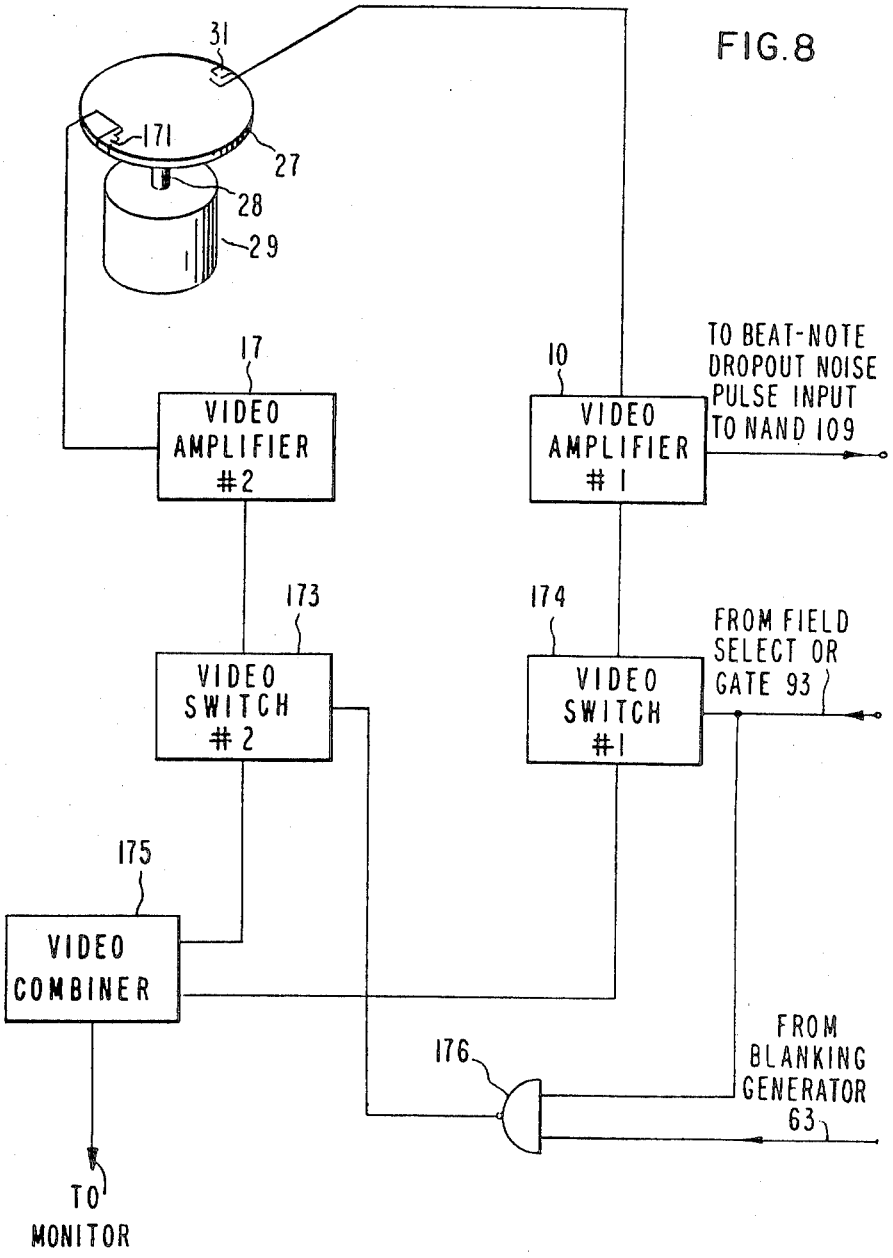
FIG. 8 is a block diagram of another embodiment of the present invention.

Referring now to FIG. 8 there is shown in block diagram form another embodiment of the present invention in which the duty cycle of the television monitor is increased to 100 percent. This embodiment utilizes a major portion of the apparatus shown in FIGS. 5A through 5D and which is not shown again in FIG. 8. The flicker correcting circuitry comprising elements 124, 126, 128, and 129 is not utilized. The noise-free half of the video tape is reproduced twice during each cycle, the second reproduced field being used to fill in the blank frame period provided in the above described embodiment.

The head disk 27 is provided with a second magnetic head 171 spaced 180° from the first head 31, this second head being coupled through a second video amplifier circuit 172 to a video switch 173. The output of the video amplifier in the video recorder system 10 associated with the first magnetic head 31 is coupled to an associated video switch 174.

Operation of the two video switches is controlled from the logic circuitry of FIGS. 5A through 5D. The output of the exclusive OR gate 93 operates video switch 174 to couple the output of the first video amplifier 10 through to the video combiner circuit 175 which transmits the video signal to the television monitor during the ON time of exclusive OR gate 93 (trace 83'). Thus the noise-free field from head 31 is reproduced on the monitor.

The output of OR gate 93 is also coupled to one input of NAND gate 176, the other input to NAND gate 176 being coupled to the output of blanking generator 66. During the OFF time of OR gate 93 and during the period that no negative going pulses are appearing from the blanking generator 66 at the beginning and the end of OFF time of OR gate 93, the output of NAND gate 176 goes high to turn on the video switch 173 and couple the second video amplifier 172 through the video combiner 175 and on to the television monitor. The noise-free field region being reproduced from the head 171 is thus displayed on the monitor during the time the first head is encountering the crossover noise. The video switches 173 and 174 thus operate to alternately switch between the two heads 31 and 171 to display successive noise-free fields without the intervening blank field period.

I claim:

1. The method of recording video signals on a magnetic tape of a video tape recorder at a normal longitudinal tape speed and reproducing said video signals from said magnetic tape at normal longitudinal tape speeds and at speeds different from normal longitudinal tape speeds comprisng the steps of recording a plurality of separate non-redundant video fields in series in each one of a sequence of video tracks recording along the tape, scanning the video tracks with a magnetic reproduce head to reproduce [the recorded fields in order] *at least one recorded field per track* for display on a video display means, said reproduce head crossing over the space on the magnetic tape between adjacent video tracks and producing a noise on the video signal when the longitudinal tape speed is changed from the normal speed, and *detecting the occurrence of said noise and* blanking out that particular *noisy* field in each track at which the head crossover between adjacent tracks occurs, *whereby at least one noise-free field in each track is reproduced for display.*

2. The method as claimed in claim 1 including the step of reproducing for display on the video display means another field on said track during the period of time said particular field is being blanked out.

3. The method of recording video signals on a magnetic tape of a video recorder at a normal longitudinal tape speed and reproducing said video signals from said magnetic tape at normal longitudinal tape speeds and at speeds different from normal longitudinal tape speeds comprising the steps of recording a plurality of separate non-redundant video fields in series in each one of a sequence of video tracks recorded along the tape, scanning the video tracks with a magnetic reproduce head to reproduce [the recorded fields in order] *at least one recorded field per track* for display on a video display means, said reproduce head crossing over the space on the magnetic tape between adjacent video tracks and producing a noise on the video signal when the longitudinal tape speed is changed from the normal speed, detecting the occurrence of said noise at crossover, and blanking out from display in response to the detection of said noise that particular field in each track at which the head crossover between adjacent tracks occurs, *whereby at least one noise-free field in each track is reproduced for display.*

4. The method as claimed in claim 3 including the step of reproducing for display on the video display means another field on said track during the period of time said particular field is being blanked out.

5. The method as claimed in claim 3 including the step of producing a corrected vertical sync signal for each of the vertical sync periods between the fields recorded on the magnetic tape for use by the signal display means.

6. The method as claimed in claim 5 including the step of producing tachometer pulses from the rotating head assembly of the video recorder, said tachometer pulses serving to produce said corrected vertical sync pulses, and producing a linearly sloping analog signal for adjusting the time spacing between said corrected vertical sync pulses.

7. A video recorder system for reproducing a plurality of separate non-redundant video fields recorded in series in a track across a magnetic tape, the tracks being recorded sequentially along the tape, comprising reproducing means including a reproduce head for scanning along each series of fields in each track in sequence to reproduce [the separate fields in order] *at least one recorded field per track* for display on a signal display means, means for changing the [relative speed of the magnetic tape and the reproduce head] *longitudinal tape speed from the longitudinal tape speed during recording* to change the speed at which the video tracks are reproduced, whereby the reproduce head crosses over the space on the magnetic tape between adjacent tracks, [and] *means for detecting the occurrence of noise generated at the head crossover and* means for blanking out that particular *noisy* one of the plurality of fields in each track at which said crossover occurs, *whereby at least one noise-free field in each track is reproduced for display.*

8. A video recorder as claimed in claim 7 including means for reproducing another field from said track for display on said signal display means during the period of time said particular field is being blanked out.

9. A video recorder as claimed in 8 wherein said means for reproducing said other field comprises a second reproduce head spaced from the first reproduce head, and means for switching the display means from said first reproduce head to said second reproduce head during the period of time said first head is scanning the field at which said crossover occurs.

10. A video recorder as claimed in claim 7 including means for producing a corrected vertical sync signal for each of the vertical sync periods between the fields recorded on the magnetic tape for use by the signal display means.

11. A recorder as claimed in claim 10 including means for dimming the brightness of said signal display means during the reproduction times of the field displayed immediately before and the field displayed immediately after the switchover from blanking said particular one field to blanking said different field.

12. A video recorder system for reproducing a plurality of separate non-redundant video fields recorded in series in a track across a magnetic tape, the tracks being recorded sequentially along the tape, comprising reproducing means including a reproduce head for scanning along each series of fields in each track in sequence to reproduce [the separate fields in order] *at least one recorded field per track* for display on a signal display means, means for changing the [relative speeds of the magnetic tape and the reproduce head] *longitudinal tape speed from the longitudinal tape speed during recording* to change the speed at which the video fields are reproduced, whereby the reproduce head crosses over the space on the magnetic tape between adjacent tracks and produces a burst of noise at the crossover, and means for detecting said noise and operating in response thereto for blanking out that particular one of the plurality of fields in each track during which said crossover occurs, *whereby at least one noise-free field in each track is reproduced for display.*

13. A video recorder as claimed in claim 12 including means for reproducing another field from said track for display on said signal display means during the period of time said particular field is being blanked out.

14. A video recorder as claimed in 13 wherein said means for reproducing said other field comprises a second reproduce head spaced from the first reproduce head, and means for switching the display means from said first reproduce head to said second reproduce head during the period of time said first head is scanning the field at which said crossover occurs.

15. A video recorder as claimed in claim 12 including means for producing a corrected vertical sync signal for each of the vertical sync periods between the fields recorded on the magnetic tape for use by the signal display means.

16. A recorder as claimed in claim 15 including means for dimming the brightness of said signal display means during the reproduction times of the field displayed immediately before and the field displayed immediately after the switchover from blanking said particular one field to blanking said different field.

17. In a system for reproducing video signals from a magnetic tape recorded at a predetermined longitudinal tape speed and having a plurality of video tracks angularly disposed across said magnetic tape and spaced by guard bands, each of said video tracks including a plurality of complete, successive, non-redundant fields, said fields positioned in said tracks so that the portions of said video tracks at each tape edge contain at least a segment of a vertical blanking interval, the combination comprising means for scanning said video tracks to reproduce [said fields] *at least one field per track,* means for longitudinally transporting said magnetic tape at said recorded tape speed or at another speed, and means for [blanking out reproduced fields containing] *detecting* noise picked up by said scanning means from said guard bands when said magnetic tape is transported at speeds different from said recorded tape speed, *and*

*means for blanking out reproduced fields containing said noise, whereby at least one noise-free field in each track is reproduced.*

18. The combination of claim 17 wherein said other speed is zero whereby a still frame is reproduced.

19. The combination of claim 17 wherein said other speed has a direction of tape travel reversed from the direction of tape travel during recording whereby reverse action motion is reproduced.

20. The combination of claim 17 further comprising means for producing corrected vertical sync signals.

21. The combination of claim 20 further comprising means for displaying said reproduced fields, and means for dimming the brightness of said signal display means during the reproduction times of consecutively displayed adjacent fields.

22. In a system for recording and reproducing a video signal on magnetic tape, the combination comprising input means for providing a video signal having a field rate of n times 60, where n is a whole positive integer, tape transport means for longitudinally transporting said tape a first predetermined speed during recording and for longitudinally transporting said tape during reproducing at said first predetermined speed or at another speed, recording means receiving said video signal for recording said video signal on said magnetic tape in a plurality of video tracks angularly disposed across said magnetic tape and spaced by guard bands, each of said video tracks including a plurality of complete, successive, non-redundant fields, said fields positioned in said tracks so that the portions of said video tracks at each tape edge contain at least a portion of a vertical blanking interval, means for scanning said video tracks to reproduce [said fields] *at least one field per track,* means for [blanking out reproduced field containing] *detecting noise picked up by said scanning means when said magnetic tape is longitudinally transported at speeds different from said first predetermined speed, and*

*means for blanking out reproduced fields containing said noise, whereby at least one noise-free field per track is reproduced.*

23. The combination of claim 22 wherein said other speed is zero whereby a still frame is reproduced.

24. The combination of claim 22 wherein said other speed has a direction of tape travel reversed from the direction of tape travel during recording whereby reverse action motion is reproduced.

25. The combination of claim 22 wherein said recording means provides that the horizontal blanking intervals in each video track are substantially aligned with the horizontal blanking intervals in adjacent video tracks.

26. The combination of claim 25 wherein n is a whole positive integer greater than one.

27. The combination of claim 26 further comprising means for producing corrected vertical sync signals.

28. The combination of claim 27 further comprising means for displaying said reproduced fields, and means for dimming the brightness of said signal display means during the reproduction times of consecutively displayed adjacent fields.

* * * * *